(12) United States Patent
Gold et al.

(10) Patent No.: US 8,438,137 B2
(45) Date of Patent: May 7, 2013

(54) AUTOMATIC SELECTION OF SOURCE OR TARGET DEDUPLICATION

(75) Inventors: Stephen Gold, Fort Collins, CO (US); Sri Harshan Kapanipathi, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 13/037,309

(22) Filed: Feb. 28, 2011

(65) Prior Publication Data
US 2012/0221525 A1 Aug. 30, 2012

(51) Int. Cl.
*G06F 17/30* (2006.01)
(52) U.S. Cl.
USPC .......................................... 707/664

(58) Field of Classification Search .................. 707/2, 3, 707/654, 664; 709/223
See application file for complete search history.

(56) References Cited

U.S. PATENT DOCUMENTS

| 7,814,149 | B1 | 10/2010 | Stringham |
| 2006/0171523 | A1 | 8/2006 | Greenwell |
| 2009/0228599 | A1 | 9/2009 | Anglin et al. |
| 2009/0254609 | A1 | 10/2009 | Wideman |
| 2010/0094817 | A1 | 4/2010 | Ben-Shaul et al. |
| 2012/0011101 | A1* | 1/2012 | Fang et al. ............... 707/654 |

* cited by examiner

*Primary Examiner* — Etienne Leroux
(74) *Attorney, Agent, or Firm* — Arthur Ortega

(57) ABSTRACT

Techniques for selecting between source and target deduplication include analyzing resource information related to resources available for deduplication, analyzing backup metadata of a backup job containing formation related to backup of data from the source to the target, and selecting between deduplication on the source or the target based on the analyzed resource information and the backup metadata.

20 Claims, 3 Drawing Sheets

US 8,438,137 B2

AUTOMATIC SELECTION OF SOURCE OR TARGET DEDUPLICATION

BACKGROUND

Deduplication is a data compression technique to reduce redundant data which may improve storage utilization. For example, in the deduplication process, duplicate data is deleted, leaving only one copy of the data to be stored, along with references to the unique copy of data. Deduplication can reduce the required storage capacity since only the unique data is stored. Deduplication can occur close to where data is created, which is often referred to as "source deduplication." It can occur close to where the data is stored, which is commonly called "target deduplication."

DETAILED DESCRIPTION

Figure 1:
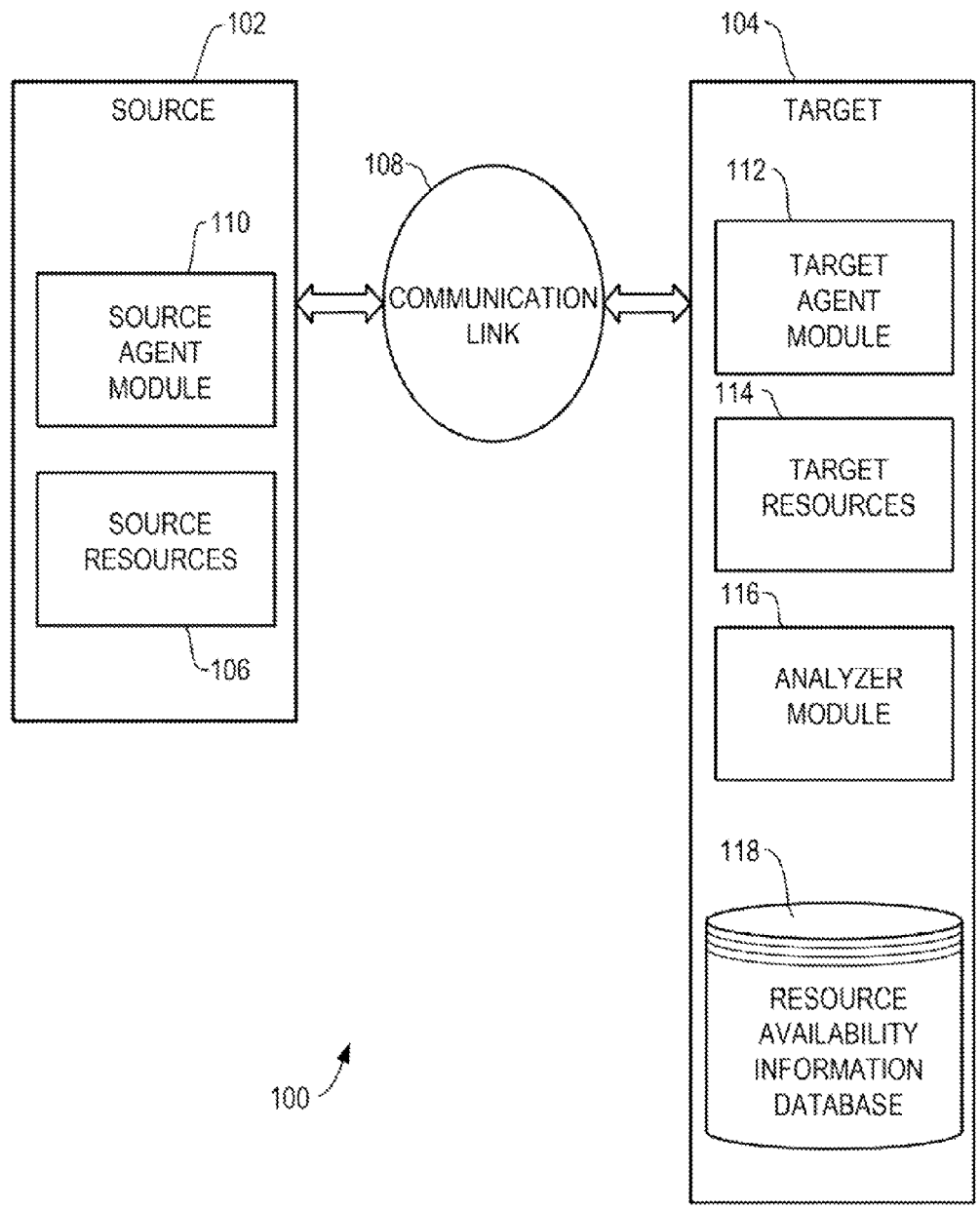
FIG. 1 is an embodiment of a high-level diagram showing an example of a system which may be used to select between source and target deduplication.

A deduplication system may include data protection protocols that can provide an option to either perform deduplication computations on the source or on the target. For example, a deduplication system may include a source (client device) coupled to a target (backup device) over a communication link or network and the system may be capable of performing deduplication on the source or the target. The source can receive a backup job which may include information related to a backup, such as archive or backup storage, of source data from the source onto the target.

Deduplication processing can be performed on the source by having the source preprocess data at the source to determine whether the source data is duplicate and therefore not necessary to send to the target for storage or backup. For example, the source can implement source deduplication processing which may include performing computations such as generating checksums (e.g. hash signatures) on source data at the source and sending the hash data to the target over the communication link. The target may compare the received hash data with stored hash data from a repository of previous hash data generated from source data. If the target determines that the received hash data matches the stored hash data, then this indicates that the source data has already been stored on the target, that is, the source data is duplicate data. In this case, it is not necessary to have the source send source data to the target over the link. On the other hand, if the received hash data does not match hash data stored on the repository, then this indicates that the source data has not already been stored on the target, that is, the source data is new or not duplicate data. In this case, it may be necessary to have the source send the source data to the target over the communication link. Therefore, performing deduplication computations on the source may require consumption of additional source resources, such as source processor and memory, but may reduce the amount of backup traffic that would need to be sent over the communication link to the target.

Deduplication processing can be performed on the target. For example, the target can implement target deduplication processing which can include performing computations such as generating checksums (e.g., hash signatures) on source data received from the source. The target may compare the generated hash data with stored hash data from a repository of previous hash data generated from source data. If the generated hash data matches the stored hash data, then this indicates that the source data has already been stored on the target, that is, the data is duplicate data. In this case, the target does not have to store the source data to storage because the data has already been stored. On the other hand, if the generated hash data does not match the stored hash data on the repository, then this indicates that the source data is new data which has not been stored on the target, that is, it is not duplicate data. In this case, the target will need to request that the data be transferred from the source to the target. The target will then received this new source data and store it in storage. Therefore, performing deduplication computations on the target may not require consumption of source resources but may require that all the backup data be transferred from the source to the target over the communication link.

In such a system, a user or customer may be responsible for choosing and manually setting a deduplication mode (source-side or target-side) for each of the backup jobs. For example, the user may specify a backup target device that would be set to always use source (client) deduplication and another target on the same device that would be set to always use device side deduplication. The user then could direct different backup jobs to each target based on the user's knowledge or understanding of the resources needed to perform the backup job. However, the user may not have sufficient knowledge of the available hardware and software resources on the source or the communication link to make an adequate decision and so may likely make incorrect choices. This may result in decreased performance because, for example, the source may not have sufficient resources to perform source-side deduplication, or the communication link may not have sufficient resources to perform target-side deduplication, etc. Therefore, the user may have to frequently modify their backups to switch from one backup target-side mode target to another target-side target to adjust the performance.

To help address this situation, in some embodiments of the invention, disclosed are techniques which may help reduce the need for a user to statically set either source-side or target-side mode deduplication. In some embodiments of the invention, disclosed are techniques to allow automatic deduplication mode selection to be performed by the system so deduplication processing could dynamically switch from source-side to target-side depending on the available resources on the source and the target and the communication link connecting the source and target. This may help reduce the need for the user to have to manually set the modes and help improve the use of available hardware and software resources.

In some embodiments of the invention, disclosed is method of selecting between source and target deduplication. The method includes analyzing resource information related to resources available for deduplication and analyzing information about (metadata) of a backup job to backup data from the source to the target. The method then selects between deduplication on the source or the target based on the analyzed resource information and the metadata of the backup job. In this manner, deduplication processing can automatically and dynamically switch between source (client-side) and target (target device-side) based on available resources on the source, target and communication link between the source and target. For example, in one embodiment, disclosed is a technique that can analyze backup job information to estimate resource requirements for processing the backup job, analyze historical resource information to estimate what resources will be available for the backup job, and then make a determination as to whether source or target deduplication is preferable based on the estimated requirements. These techniques may help reduce the need for a user to have to manually set deduplication modes and may improve the use of resources.

FIG. 1 illustrates an embodiment of a high-level diagram of an example system 100 which may be used to select between source and target deduplication. The system 100 includes a source 102 capable of communicating with a target 104 over a communication link 108. The source 102 may include a source agent module 110 that can monitor the usage and availability of source resources 106 of the source. The source 102 can generate resource availability information based on the information derived from monitoring usage of source resources 106. The source 102 can monitor resources 106 according to a periodic basis (periodic parameter), such as every 30 minutes, and for a period of time (duration parameter) such as for a month. These parameters can be user settable or configurable. This generated resource availability information can be used to provide historical or statistical data for further processing, such as trend analysis, to estimate or predict resource information availability at a later time when resources are required such as to perform or execute a backup job. The source 102 can send this information to target 104 which can then store it in a resource availability database 118. The information from the database 118 can be used by analyzer module 116 for subsequent processing such as selecting between source and target deduplication.

Source resources 106 can include resources needed or required to perform deduplication processing on source 102. For example, source 102 may require resources for deduplication processing such as performing deduplication computations such as checksums on source data (e.g., hash generation of source data at source), sending the checksum data and source data to the target and other processing necessary for deduplication processing. The deduplication computations can be performed on any data object including streams of data, entire file systems, one or more files of a file system and the like. Source resources 106 can include hardware resources, software resources or a combination thereof. For example, source resources 106 can include one or more processors and storage such as memory on the source side which may be needed for deduplication processing. In one example, source 102 can periodically monitor processor usage and memory usage and generate resource availability information for subsequent processing.

The source agent module 110 may also be configured to generate information related to the performance of communication link 108 between source 102 and target 104. For example, source agent module 110 can periodically test the performance of communication link 108 by assessing the bandwidth capability of the transmission or transport of data over the link. This information can be used in the process of selecting between source or target deduplication. For example source 102 can send this information to target 104 which can then store it in resource availability database 118 for use by analyzer module 116 for subsequent processing such as selecting between source and target deduplication.

The source agent module 110 can also be configured to receive and process backup job information such as metadata related to the backup job. For example, backup job information may include information about the size (expected size) of the backup job, the source of the data for the backup job, the target device to be used to backup the data, the type of backup (such as a full backup compared to an incremental backup) and other data related to a backup job. A full backup refers to a backup of all of all the data object such as all the files of a file system. An incremental backup refers to a backup of the changes in the data object such as changes or new files of a file system. The source 102 is capable of handling one or more backup jobs concurrently. The source 102 can send this information to target 104 which can then store it in resource availability database 118 for use by analyzer module 116 for subsequent processing such as selecting between source and target deduplication.

The target 104 may include a target agent module 112 that can monitor the usage and availability of target resources 114 on target 104. Similar to source resources 106, target resources 114 can be used to perform deduplication processing on target 104. For example, target 104 may require resources for target deduplication processing including deduplication computations such as hash generation of data received from source 102 and other processing necessary for deduplication processing. Target resources 114 can include hardware resources, software resources or a combination thereof. For example, target resources 114 can include one or more processors and storage such as memory on target 104 which may be needed for deduplication processing. In one example, target agent module 112 can periodically monitor processor usage and memory usage and generate resource availability information for subsequent processing. The target agent module 112 can store such resource information in resource availability information database 118 for subsequent use by analyzer module 116, as explained below in further detail. In addition, target agent module 112 can receive source availability information related to resource use and availability on source 102 and store such information in database 118 for subsequent use by analyzer module 116.

The target agent module 112 may also be configured to generate information related to the performance of communication link 108 between source 102 and target 104. This information can be used in the process of selecting between source or target deduplication. For example, target agent module 112 can periodically test the performance of communication link 108 by assessing the transmission of data over the link. The target agent module 112 can store this information in resource information database 118 for subsequent use by analyzer module 116. The target agent module 112 can also receive communication performance information from source 102 and store it in resource information database 118 for subsequent use by analyzer module 116.

The analyzer module 116 can be configured to select between deduplication on source 102 or target 104. For example, analyzer module 116 can retrieve from resource database 118 information such as source and target resource availability information, communication performance information and backup job information. It can then analyze such information to determine whether deduplication is to be performed on source 102 or target 104. For example, in one embodiment, analyzer module 116 can analyze backup job information to estimate resource requirements for processing the backup job and analyze resource information from the database to estimate what resources will be available for the backup job. The analyzer module 116 can then assess whether there are sufficient resources available to satisfy the resource requirements of the backup job and then make a determination as to whether source or target deduplication is preferable based on the estimated requirements.

The source 102 and target 104 can be one or more computing components that have data processing and data storage functionality and can comprise hardware, software or a combination thereof. For example, source 102 and target 104 can be an electronic computing device comprising a combination of hardware and software configured to implement the techniques described herein. The source 102 and target 104 may include storage subsystems such as tape, disk memory and a combination thereof. Example sources and targets may include personal computers, client computers, file servers, mail servers, computers with multiple core processors, media servers, stand-alone personal desktop or laptop computers (PC), workstations, personal digital assistants (PDAs), mobile devices, server computers, or appliances and the like. The source 102 and target 104 can also be a software based component or module configured to emulate hardware.

Although a single source 102 and target 104 are shown, it should be understood that more than one source and more than one target can be employed. The components of source 102 (i.e., source agent module 110 and source resources 106) are shown located in source 102, but it should be understood that the components (or a portion thereof) could reside in target 104, in a separate device or a combination thereof. Likewise, the components of target 104 (i.e., target agent module 112, target resources 114, analyzer module 116 and database 118) are shown located in target 104, but it should be understood that the components (or a portion thereof) could reside in source 102, in a separate device or a combination thereof. The communication link 108 can comprise any means of facilitating the exchange of data between source 102 and target 104. For example, communication link 108 can be any communication network such as an Ethernet based network, a wide area network (WAN), local area network (LAN), storage area network (SAN), network access storage (NAS), wired communication network, wireless communication network and the like or a combination thereof.

Figure 2:
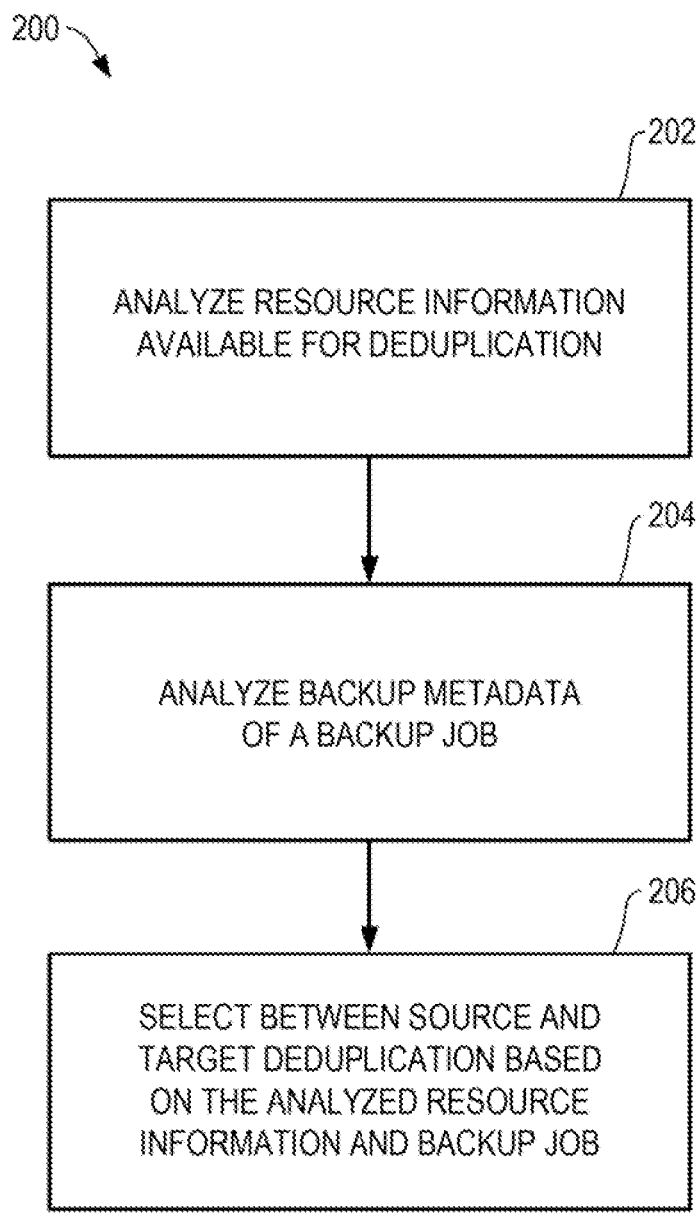
FIG. 2 is an embodiment of a flow diagram illustrating operations which may be implemented for selecting between source and target deduplication.

FIG. 2 is an embodiment of a flow diagram 200 illustrating operations which may be implemented for selecting between source and target deduplication.

At block 202, target 104 can analyze resource information related to resources available for deduplication. For example, source 102 can periodically monitor usage of source resources 106, generate resource availability information based on such usage, and store this information in database 118 for subsequent retrieval by target 104. Likewise, target 104 can periodically monitor target usage of resources 114, generate resource availability information based on such usage, and store this information in database 118 for subsequent retrieval by target 104. The target 104 can retrieve from resource database 118 resource availability information including resource availability of source 102 (e.g., source processor and memory load) and resource availability information of target 104 (e.g., target processor and memory load). The target 104 can also analyze performance information of communication link 108 to determine communication resource availability such as the bandwidth capability of transmission of data over the link and the like.

At block 204, target 104 can analyze information or metadata of a backup job. For example, a backup job may contain information related to a request to backup data from source 102 to target 104. The source 102 can receive the backup job and then forward it to target 104 for analysis by analyzer module 116. The backup job may include information related to the size (e.g., expected size) of the backup job, the source of the data for the backup job, the target device to be used to backup the data, the type of backup (such as a full backup compared to an incremental backup) and other data related to a backup job.

At block 206, target 104 can make a determination or selection between deduplication on the source or the target based on the analyzed resource information and backup job metadata. For example, in one embodiment, analyzer module 116 can analyze backup job information to estimate resource requirements for processing the backup job and analyze historical resource information such as resource availability information from database 118 to estimate what resources will be available for the backup job. The analyzer module 116 can then make a determination as to whether source or target deduplication is preferable based on the estimated resource requirements and the estimated available resources to satisfy the requirements. Analyzer module 116 may determine that it is preferable to perform deduplication on source 102. In this case, target 104 can communicate this decision to source 102 which can respond by performing deduplication processing including deduplication computations such as generating hash signatures on the source data. The source 102 could then send the hash signatures to target 104 for further processing.

On the other hand, target 104 may determines that it may be preferable to perform deduplication on the target. In this case, target 104 can communicate this decision to source 102 which can then respond by sending source data to the target. The target 104 could then perform deduplication processing including deduplication computations such as generating hash signature on the received source data. In this manner, it may be possible to automatically and dynamically switch between source (client-side) and target (target device-side) deduplication based on available resources (source, target and communication link) and resource requirements. This may help reduce the need for a user to have to manually set deduplication modes and may improve the use of resources.

Figure 3:
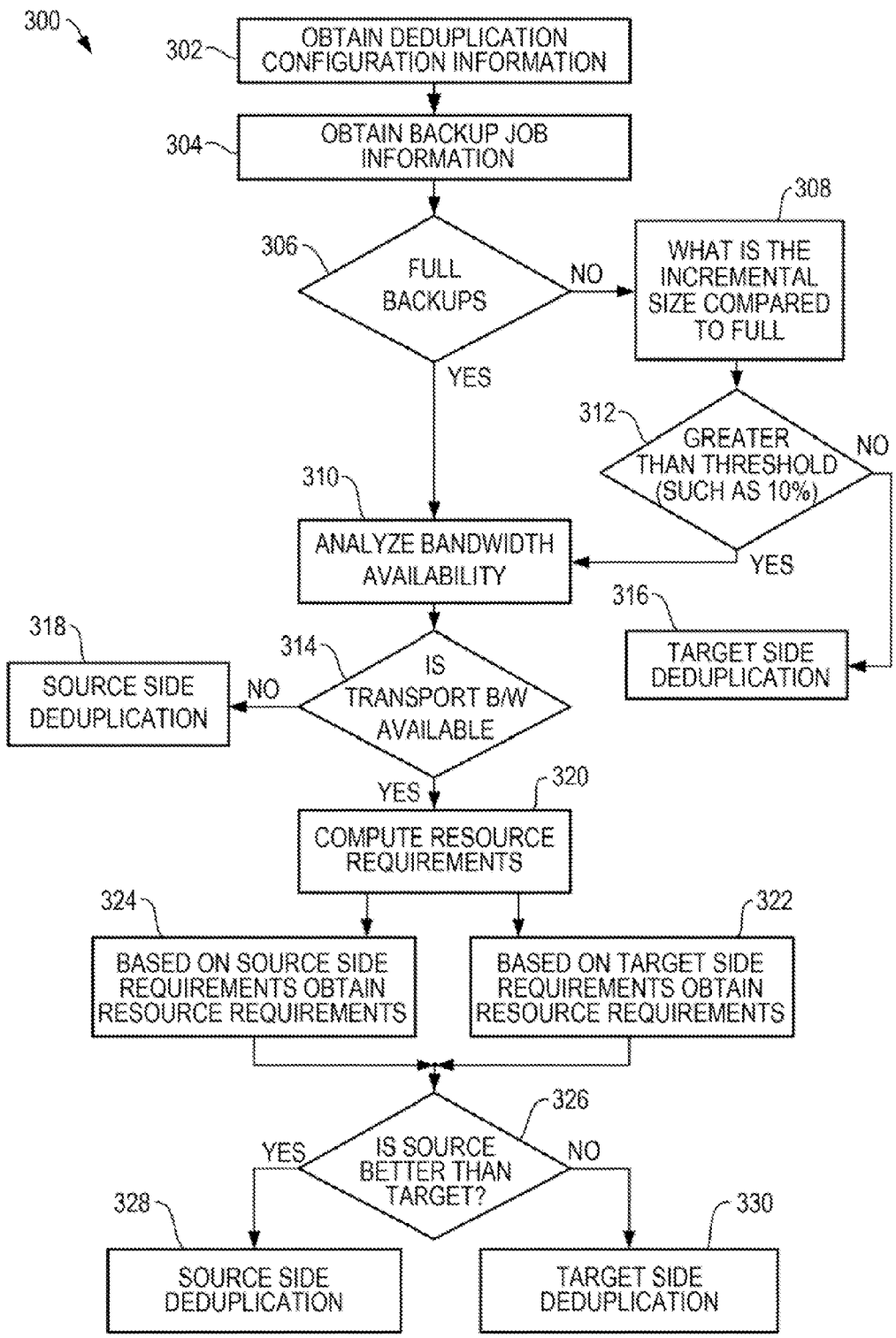
FIG. 3 is another embodiment of a flow diagram illustrating operations which may be implemented for selecting between source and target deduplication.

FIG. 3 is another embodiment of a flow diagram 300 illustrating operations which may be implemented for selecting between source and target deduplication. Below is a description of a process of automatic selection of source or target deduplication based on estimated available resource information and estimated resource requirements of a backup job.

At block 302, target 104 can analyze deduplication configuration information which can be used by the target during processing. For example, in one embodiment, source 102 may allow a user to provide configuration information such as user specified preferences including timing parameters (frequency-how often and duration-how long) for monitoring resources which can be used for generating resource availability information for use in estimating resource availability for a future backup job. Other configuration information can specify or control operation of analyzer module 116. For example, a user can specify a default deduplication mode (source or target) when target 104 encounters a conflict during its decision making process such as when both source deduplication and target deduplication are equally reasonable candidates. In another example, a user can specify a default deduplication mode (source or target) when target 104 encounters a situation where both the source and target have insufficient resources for deduplication. In another example, a user can provide thresholds that specify when it may not be worthwhile to perform source or target deduplication or specify other cases in which the target is always to select source or target deduplication. This configuration information can be used by target 104 as well as source 102 during its operation.

At block 304, target 104 can obtain information such as metadata related to the backup job. For example, in one embodiment, analyzer module 116 can analyze the metadata related to the backup job such as the size (expected size) of the backup job, the source of the data for the backup job, the target device to be used to backup the data, the type of backup (such as full backup compared to an incremental backup) and other data related to a backup job.

At block 306, target 104 can evaluate the metadata or information of the backup job such as the backup policy of the backup job. If the metadata indicates that the policy type is an incremental type of backup, that is, a backup of changes or new data, then processing proceeds to block 308. On the other hand, if the metadata indicates that the policy type is a full backup then processing proceeds to block 310.

At block 308, target 104 can analyze the size of an incremental backup relative to a full backup. For example, in one embodiment, analyzer module 116 can compare whether the incremental size is small relative to the full backup. For example, analyzer module may evaluate whether the incremental size is greater than some threshold (such as 10%) or smaller than the full backup. If the incremental size is small size relative to the full backup (e.g., incremental is 10% or smaller than the full backup), then processing proceeds to block 316 (target deduplication) because most likely the majority of the data in the incremental backup is new data that may not deduplicate efficiently at the source. Otherwise, processing proceeds to block 310 for subsequent analysis of communication resource information.

At block 316, target 104 may have determined that it may be preferable to select target deduplication because most of the incremental backup data would most likely have to be sent over communication link 108. Some technologies, such as Symantec Openstorage Technology (OST), would be aware of the backup meta-data which may include the type of the backup and the expected transfer size of the backup segment.

At block 310, target 104 may have determined that the metadata of the backup job indicated a full backup or a large incremental and then proceeded to analyze resource information related to the communication link. For example, in one embodiment, analyzer module 116 may evaluate communication information such as the available network bandwidth by obtaining communication resource availability information from database 118. The network bandwidth may be a function of speed of the transport, backup window size and timing, backup size and the like. This communication information may serve as historical data which analyzer module 116 can use to estimate future or possible communication bandwidth or other communication performance. In other example, target 104 or source 102 may perform regular quick performance tests from source memory to target memory since performance can vary over time depending on the communication traffic. The analyzer module 116 can also factor in the size of the backup data to be transferred over the available bandwidth and check whether this will fit within a backup window. The backup window refers to the period of time when backups are scheduled or permitted to run on a system.

If analyzer module 116 determines that network bandwidth is insufficient to perform target deduplication (which may require transfer of all the backup data over the network) then processing proceeds to block 318 (source deduplication). At block 318, analyzer module 116 determined that it would be preferable to select source deduplication mode (since this may reduce network traffic to just the unique data in the backup rather than the entire backup). On the other hand, if the analyzer module 116 determines that there is sufficient network bandwidth to handle target deduplication, then processing proceeds to block 320.

At block 320, target 104 can further process resource information to allow selection between source or target deduplication. For example, in one embodiment, analyzer module 116 can allow selection between two modes of deduplication (source and target) based on the available source and target resources. For example, in one embodiment, analyzer module 116 can analyze backup job information to estimate resource requirements for processing the backup job, and analyze resource information from the database to estimate what resources will be available to meet or the requirements of the backup job. The target 104 can then make a determination as to whether source or target deduplication is preferable based whether the estimated resource availability can meet the resource requirements of the backup job. At block 324, analyzer module 116 can estimate the amount of source resources (source processor and memory) needed to perform the deduplication processing on the backup job (taking its size into account) at the source. At block 322, analyzer module 116 can estimate the amount of target resources (target processor and target memory) needed to perform the deduplication processing on the backup job (taking its size into account) at the target.

At block 326, target 104 can compare these resource requirements with the current processor and memory resources on the source and target. For example, in one embodiment, analyzer module 116 can determine whether to perform the deduplication on the source or target based on the results of the comparison.

If analyzer module 116 determines that it may be preferable to perform deduplication on source 102, then processing proceeds to block 328. On the other hand, if analyzer module 116 determines that it may be preferable to perform deduplication on target 104, then processing proceeds to block 330. The analyzer module 116 can consider user configured preferences or parameters as explained above. For example, a user may be have specified a default deduplication mode (source or target) when target 104 encounters a situation where both the source and target have insufficient resources for deduplication.

At block 328, target 104 can communicate with source 102 that deduplication is to be performed on the source. In this case, source 102 may perform computations such as generating checksums (e.g. hash signatures) on source data at the source and send the hash data to the target over the communication link. The target may compare the received hash data with stored hash data from a repository of previous hash data generated from source data. If the received hash data matches the stored hash data, then this indicates that the source data has already been stored on the target, that is, it is duplicate data. In this case, it is not necessary to have the source send source data to the target over communication link 108. On the other hand, if the received hash data does not match hash data stored on the repository, then this indicates that the source data has not already been stored on the target, that is, it is not duplicate data. In this case, it may not be necessary to have the source send the source data to the target over the communication link. Therefore, performing deduplication computations on source 102 may require consumption of additional source resources, such as source processor and memory, but may reduce the amount of backup traffic that would need to be sent over the communication link to the target.

At block 330, target 104 can communicates with source 102 that deduplication is to be performed on the target. In this case, target 104 can perform computations such as generating checksums (e.g., hash signatures) on source 102 data received from the source. The target 104 may compare the generated hash data with stored hash data from a repository of previous hash data generated from source data. If the generated hash data matches the stored hash data, then this indicates that the source data has already been stored on the target, that is, the data is duplicate data. In this case, target 104 does not have to store the source data to storage which the data has already been stored. On the other hand, if the generated hash data does not match the stored hash data on the repository then this indicates that the source data is new data which has not been stored on the target, that is, it is not duplicate data. In this case, the target will need to request that the data be transferred from the source to the target. The target will then receive this new source data and store it in storage. Therefore, performing deduplication computations on target 104 may not require consumption of source resources but may require that all the backup data be transferred from source 102 to the target over communication link 108.

The components of source 102 and target 104 can be implemented with machine-readable instructions that are loaded for execution on processor(s). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

Further, the components shown and described in this application may also be implemented in program code (e.g., firmware and/or software and/or other logic instructions) stored on one or more computer readable medium and executable by one or more processors to perform the operations described in this application. The components are merely examples of various functionality that may be provided, and are not intended to be limiting. The embodiments shown and described are provided for purposes of illustration and are not intended to be limiting.

The invention claimed is:

1. A method of selecting between source and target deduplication, the method comprising:
an analyzer module operational at the target for analyzing resource information which is received from the source and related to resources available for deduplication;
the analyzer module analyzing backup metadata of a backup job which is received from the source and containing information related to backup of data from the source to the target; and
the analyzer module selecting between deduplication on the source or the target based on the analyzed resource information and the backup metadata.

2. The method of claim 1, further comprising generating source resource information by monitoring source processor and source memory availability for deduplication.

3. The method of claim 1, further comprising estimating resources necessary to perform source or target duplication based on an estimate of resource availability derived from the resource information and an estimate of resource requirements derived from the information of the backup job.

4. The method of claim 1, further comprising generating target resource information by monitoring target processor and target memory availability for deduplication.

5. The method of claim 1, further comprising generating communication resource information by checking communication between the source and the target.

6. The method of claim 1, wherein source deduplication includes the source generating hash data of source data and sending the hash data to the target.

7. The method of claim 6, further comprising the target evaluating the received hash data to determine whether to request source data from the source.

8. The method of claim 1, wherein target deduplication includes the target receiving source data from the source for generating hash data from the received source data.

9. An apparatus to select between source and target deduplication, the apparatus comprising:
an analyzer module operational at the target and configured to analyze resource information which is received from the source and related to resources available for deduplication, analyze backup metadata of a backup job which is received from the source and containing formation related to backup of data from the source to the target; and select between deduplication on the source or the target based on the analyzed resource information and the backup metadata.

10. The apparatus of claim 9, wherein resource information includes source resource information related to source processor and source memory availability for deduplication.

11. The apparatus of claim 9, wherein the analyzer module is further configured to estimate resource necessary to perform source or target duplication based on an estimate of resource availability derived from the resource information and an estimate of resource requirements derived from the information of the backup job.

12. The apparatus of claim 9, wherein resource information includes target resource information related to target processor and target memory availability for deduplication.

13. The apparatus of claim 9, wherein resource information includes communication resource related to performance of a communication link between the source and the target.

14. The apparatus of claim 9, wherein source deduplication includes the source generating hash data of source data and sending the hash data to the target.

15. The apparatus of claim 14, wherein the analyzer module is further configured to evaluate the received hash data to determine whether to request source data from the source.

16. The apparatus of claim 9, wherein target deduplication includes the target receiving source data from the source for generating hash data from the received source data.

17. An article comprising at least one computer-readable storage medium storing instructions that upon execution cause a computer to:
analyze at a target resource information which is received from the source and related to resources available for deduplication;

analyze at the target backup metadata of a backup job which is received from the source and containing formation related to backup of data from the source to the target; and select at the target between deduplication on the source or the target based on the analyzed resource information and the backup metadata.

18. The article of claim 17, further comprising instructions that upon execution cause a computer to generate source resource related to source processor and source memory availability for deduplication.

19. The article of claim 17, further comprising instructions that upon execution cause a computer to generate target resource related to target processor and target memory availability for deduplication.

20. The article of claim 17, further comprising instructions that upon execution cause a computer to estimate resource necessary to perform source or target duplication based on an estimate of resource availability derived from the resource information and an estimate of resource requirements derived from the information of the backup job.

* * * * *

UNITED STATES PATENT AND TRADEMARK OFFICE
CERTIFICATE OF CORRECTION

PATENT NO. : 8,438,137 B2
APPLICATION NO. : 13/037309
DATED : May 7, 2013
INVENTOR(S) : Stephen Gold et al.

Page 1 of 1

It is certified that error appears in the above-identified patent and that said Letters Patent is hereby corrected as shown below:

In the Claims

In column 10, lines 31-32, in Claim 9, delete "formation" and insert -- information --, therefor.

In column 11, lines 2-3, in Claim 17, delete "formation" and insert -- information --, therefor.

Signed and Sealed this
Twentieth Day of August, 2013

Teresa Stanek Rea
*Acting Director of the United States Patent and Trademark Office*